United States Patent [19]
Huret et al.

[11] 3,924,487
[45] Dec. 9, 1975

[54] CABLE TRACTION AND RELEASE DEVICE

[76] Inventors: Roger Huret; Jacques Huret, both of avenue Felix Faure, 92000 Nanterre, France

[22] Filed: Nov. 4, 1974

[21] Appl. No.: 520,951

[30] Foreign Application Priority Data
Nov. 7, 1973 France .............................. 73.39609

[52] U.S. Cl. .................. 74/489; 74/501 R; 74/531; 280/236; 280/289
[51] Int. Cl.² .......................................... B62D 1/20
[58] Field of Search .......... 74/488, 489, 501 R, 531; 280/289, 236, 237, 238

[56] References Cited
UNITED STATES PATENTS

| | | | |
|---|---|---|---|
| 2,874,587 | 2/1959 | Schmid | 74/489 |
| 3,110,380 | 11/1963 | Meyer et al. | 74/531 X |
| 3,180,166 | 4/1965 | Fox | 74/489 |
| 3,181,390 | 5/1965 | Juy | 74/531 |

FOREIGN PATENTS OR APPLICATIONS
238,434  11/1945  Switzerland .......................... 74/489

*Primary Examiner*—William F. O'Dea
*Assistant Examiner*—Ronald C. Capossela
*Attorney, Agent, or Firm*—Lewis H. Eslinger; Alvin Sinderbrand

[57] ABSTRACT

The traction and release device includes a control lever which pivots around a drum about which a helicoidal spring is mounted. One of the two ends of the spring presents an annular form to engage a strengthened end of the cable, the two ends of said spring each extending radially towards the spring exterior so as to engage in the recesses provided in the body of the lever.

The device is intended to control the traction and release of a cable such as that used in a derailleur or other bicycle gear change.

11 Claims, 5 Drawing Figures

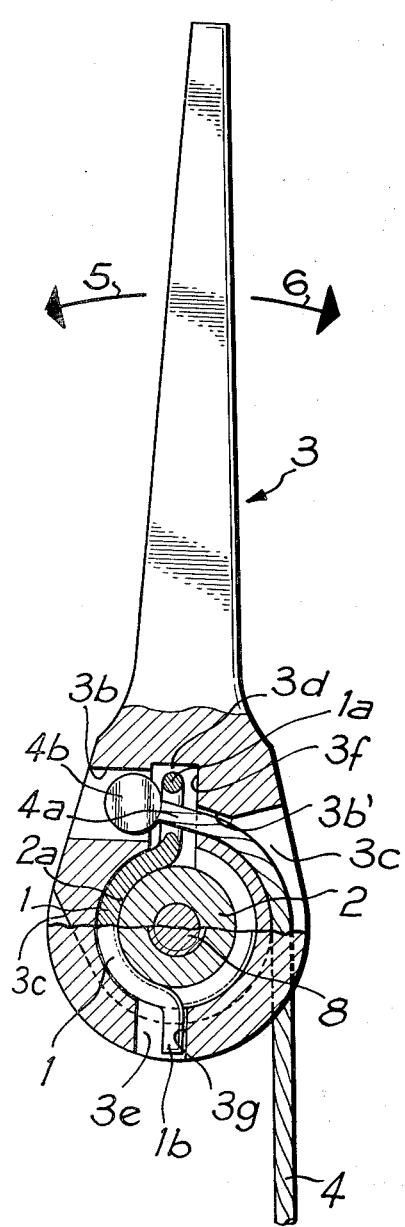
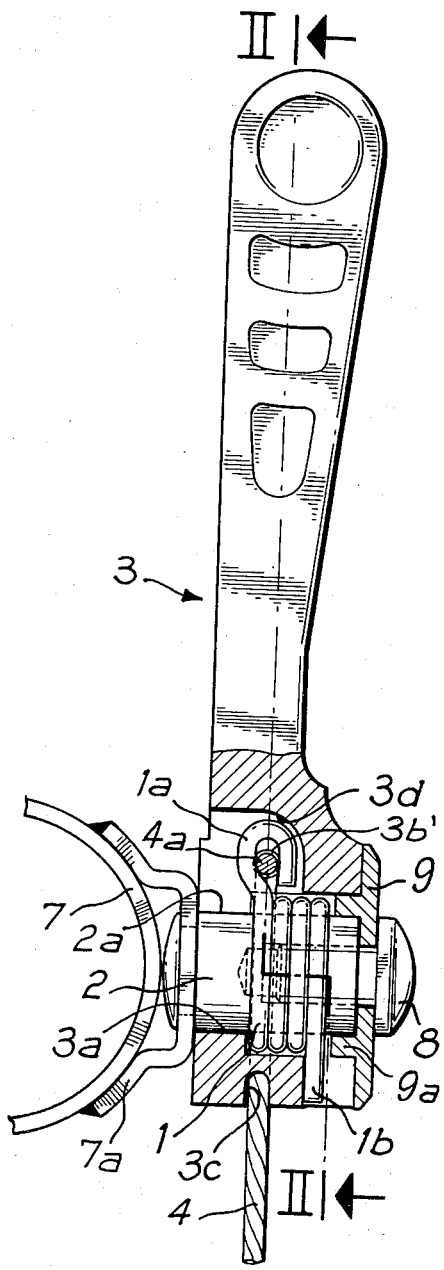
Fig. 2
Fig. 1

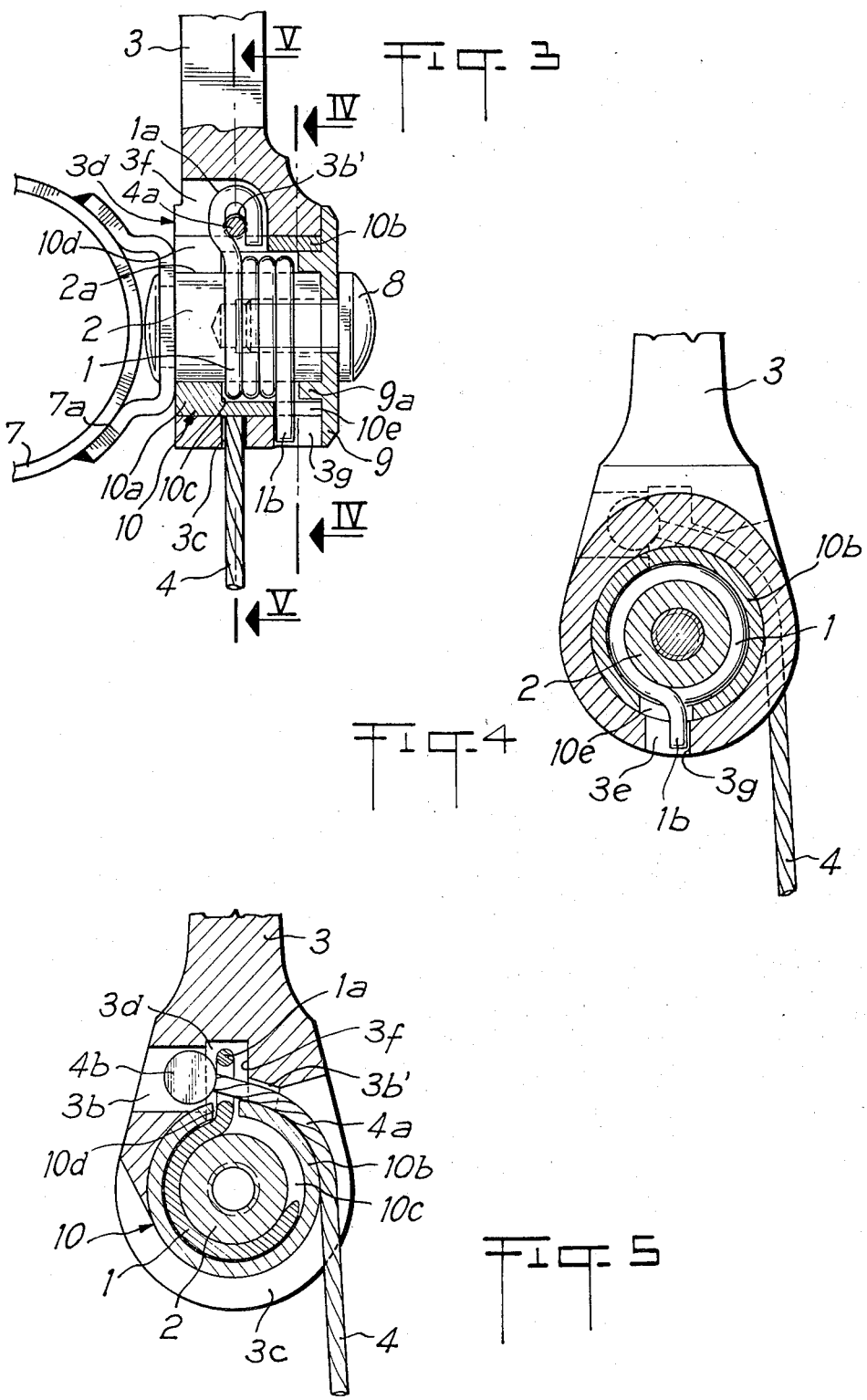

CABLE TRACTION AND RELEASE DEVICE

The present invention relates to a cable traction and release device particularly for a derailleur or other speed change for bicycles, containing on the one hand a control lever co-operating with the said cable and provided near one end with a transverse opening and pivotally mounted about a fixed support axle in the form of a drum which engages in the said opening and is integral with a part of the bicycle such as the bicycle frame and, on the other hand, a system of immobilization intended for holding the cable end in the selected position by means of the lever on application of tractive force to the said cable by an adjusting spring incorporated in the speed change, and provided with a friction mechanism such as cylindrical spiral spring which presses on the fixed drum-type axle and one end of which co-operates with the said lever.

In the known immobilization system the bent end of the spring of the friction mechanism co-operates with the control lever to which the end of the cable is so attached that in one first direction of lever movement, corresponding to tractive force applied to the cable in the direction of the front end of the said cable, the friction spring is unlocked and does not hinder the pivoting of the lever, whilst in the other direction of movement of the lever opposite to the first, the spring presses increasingly on the drum under the action of the adjusting force applied to the cable and transmitted by the latter to the lever and thence to the corresponding end of the friction spring. The forces of operation applied to the control lever in one or the other direction of pivoting are therefore appreciably different to one another. Since in one of the directions of operation the spring is self-locking and this self-locking has to be overcome by actuation of the lever, the end of the friction spring is subject to considerable forces which lead relatively quickly to rupture of the said spring and so render the whole control lever immobilization system inoperable.

The aim of the present invention is therefore to provide a particularly clever device for cable traction and release permitting, on the one hand, a powerful locking of the cable while the control level is unoperated, and free and easy motion of the lever in the two directions of pivoting without self-locking of the friction spring during the control movement.

For the type of cable traction and release device of the type mentioned above, this aim is achieved in accordance with the invention by providing a cable traction and release device, particularly for a derailleur or other bicycle speed change devices, comprising on the one hand a control lever co-operating with the said cable and provided, near one end, with a transverse opening, and mounted to pivot about a fixed supporting axle in the form of a drum which is engaged within the said opening and can be fixed to a part of a bicycle such as the bicycle frame, and on the other hand comprising an immobilization system which is intended to hold the end of the cable in the selected position by means of the lever on application of a tractive force to the cable by an adjusting spring incorporated in the change speed device, and provided with a friction mechanism such as a cylindrical helical spring which presses on the drum-type fixed axle and one end of which co-operates with said lever, wherein one of the two ends of the friction spring is connected directly to one end of the cable in such a way that any traction applied to the end of the spring in the direction towards the other end of the cable tends to press the spring onto its supporting axle, and in that the control lever has two lugs, each of which is associated with one extremity of the said spring and is able to influence the corresponding end of the spring in one of two opposing directions of friction spring disengagement.

According to the invention, the control lever no longer has to overcome the self-locking action of the friction spring in pivoting in either direction. On the contrary, the pivoting of the lever serves firstly to disengage, that is to say, to open the friction spring which in any position determined by the lever re-engages automatically under the action of the cable and locks the end of the latter on the supporting axle. In any case the lever does not contribute to self-locking of the friction spring on the supporting axle, hence it can no longer be used to supply a greater force to the spring than its mechanical resistance.

Other characteristics and advantages of the present invention will be seen from the following description of two embodiments of the invention given by way of example and with reference to the accompanying drawings, in which:

FIG. 1 shows a partial axial longitudinal section of a first embodiment according to the invention, FIG. 2 shows a cross-ectional view along the line 11—11 of the device in FIG. 1, FIG. 3 shows a partial axial longitudinal section of a second embodiment according to the invention.

FIG. 4 shows a cross-section of the device along the line IV—IV of FIG. 3, and

FIG. 5 shows a cross-section of the device along the line V—V of FIG. 3.

As can be seen from FIG. 1, the traction and release device of the invention essentially contains a helical cylindrical spring, called the friction spring 1, which is wound and pressed around a supporting axle in the form, for example, of a constant diameter cylindrical drum 2 in a fixed position, e.g. integral with a collar 7 which can be fixed, say, on one of the tubes of a bicycle frame (not shown).

A control lever 3 at its lower widened end has a multipart opening 3a into which the spring 1 and drum 2 are introduced. The portion of the opening 3a, i.e. the part by the collar 7, is directly supported on a cylindrical surface 2a of the drum 2, whilst the portion away from the collar 7 has a larger inside diameter than the first portion and it envelopes the spring 1 with a certain amount of radial play.

A bracket 7a welded on the collar 7, a screw 8 extending axially through the drum 2 from the side remote from the collar, and a retaining disc 9 which engages the lever 3 against the bracket 7a by means of the screw 8, prevent any axial motion of the lever 3 relative to the drum 2, an annular projection 9a of disc 9 penetrating the annular space between the drum external surface 2a and the relatively larger diameter part of the opening in the lever 3 which is thus supported by the two ends of the drum 2 and is free to pivot in either direction about the axis of the drum.

Between the opening 3a of the widened end and the other narrow end, the lever 3 is provided with a seating 3b which originates at the periphery of the widened end and extends approximately tangentially to a notional cylinder coaxial to the drum 2, terminating in a base 3f which lies, for instance, parallel to the radial plane of drum 2, this plane passing through the other narrow end of lever 3. The hole 3b is intended to receive a spherical enlargement 4b of the cable end 4a, and so its cross-section is greater than that of the enlargement 4b. The base 3f is penetrated by a coupling hole 3b' which is slightly larger in diameter than the cable 4, but less than that of the spherical enlargement 4b. The coupling hole 3b' opens into a peripheral guide type orifice 3c which is provided about the widened extremity of the lever and it extends in a plane perpendicular to the cylindrical periphery of drum 2, and concentrically to the drum, from the hole 3b' over a circular arc of at least 180° and preferably up to the vicinity of the mouth of the seating 3b. From one of the lateral faces of the lever 3, e.g. from the face near the collar 7, a lateral lug recess 3d is made in the lever 3. This lateral recess 3d extends roughly parallel right across a radial plane passing simultaneously through the axis of the opening 3a and the drum 2 and through the narrow end of lever 3, one of the lateral faces of the recess 3d merging with the base 3f of the seating 3b. The depth of the recess 3d, in the axial direction of the drum, is between one-half and two-thirds of the drum length. The recess 3d is closed off towards the narrow end of lever 3 by a wall extending parallel to the axis of the opening 3a into which the recess opens on the side opposite the wall.

From the other lateral face of lever 3, for example the face on the side of disc 9, there is another lug recess such as the wide slit 3e which extends right across the radial plane of the opening 3a, this plane passing preferably through the narrow end of lever 3 so that the slit or other recess 3e is approximately diametrically opposite the first lug opening 3d in relation to the axis of the opening 3a.

The cable end 4a and, more precisely, the spherical enlargement 4b of the cable, co-operates directly and permanently, as a result of the action of the tractive forces applied permanently to the cable 4 from the direction of the rear end of the latter, with one 1a of the two extremities 1a, 1b of the friction spring so as to further press the turns of the spring around the supporting drum 2. In the embodiment under consideration the direct coupling between the front end 4a of the cable 4 and the end 1a of the spring 1 is effected in that the end 1a of the spring is folded approximately radially in the outward direction in a plane parallel to the axis of spring 1 and, preferably, radially in relation to the axis of spring 1, so as to form an eyelet which envelopes the cable extremity 4a and the spherical enlargement 4b bears against the front face thereof owing to the permanent traction applied to the cable in the direction towards the rear end of the cable. This eyelet end 1a is located with a certain lateral play in the lug opening 3d, the base 3f of which serves as an abutment against the rear face of the end 1a of the spring, i.e. against the turned face of the enlargement 4b, so that in pivoting of the lever 3 in the anti-clockwise direction (arrow 5) at least some of the turns of spring 1 are raised from the drum surface 2a, hence the spring 1 is disengaged and free to follow the pivoting movement of lever 3 without appreciable resistance. As can be seen from FIGS. 1 and 2, the front end 4a of the cable 4, after having been drawn through into the seating 3b, the spring eyelet 1a is located in the lug recess 3d and the coupling hole 3b' is guided into the peripheral orifice 3c of the wide end of the lever 3, the enlargement 4b of the cable 4 being situated partly in the seating hole 3b and partly in the lug recess 3d. Bearing in mind the preceding action, it will be seen that the application of tractive force to the cable 4 by means of the lever 3 is possible only by the intermediary of the friction spring 1.

The other end 1b of the friction spring 1 is also so arranged as to co-operate with the lug 3g of the lever 3 in the other direction of opening of the turns, this being the direction opposite to that which permits opening of the turns of the spring 1 from the end 1a of the spring 1 and by means of the lug 3f of the lever 3. For this purpose the end 1b is folded outwardly so as to present a right-hand portion which engages in the second lug recess 3e and extends, preferably radially, in relation to the axis of the spring 1. The lug 3g, intended for co-operation with the end 1b of the spring, is formed by one of the two faces of the lug recess 3e as a slit with a width in the peripheral direction of the opening 3a of the lever 3 such that none of its lateral faces is in contact with the end 1b of the spring when the lug face or base 3f of recess 3d bears against the eyelet end 1a, of the spring 1. The relative positions between the two ends of the spring 1a, 1b on the one hand, and between the two lug faces 3f, 3g on the other hand, are such that when one of the lug faces, say 3g is in contact with the end of the corresponding spring, say, the end 1b, the other lug face, say, 3f is spaced from the corresponding end of the spring, say, 1a. When, with a view to releasing the cable 4 towards its rear end, the lever 3 is made to pivot in the clockwise direction (arrow 6), the lug 3g of the recess 3e alone makes contact with the ends 1b of the spring, the turns of the spring being slightly disengaged from the drum 2 if the pivotal motion of the lever is continued beyond the initial position of contact between the lug 3g and the end 1b of the spring. Pushed by the lug 3g and drawn by the cable 4, the disengaged spring 1 can then follow the pivotal movement of the lever, but as soon as the end 1b of the spring is no longer raised from the drum 2, the turns of the spring re-engage the drum 2, hence cable traction applied permanently in the clockwise direction influences the eyelet extremity 1a, immediately causing self-locking of the spring 1 on the drum 2.

Thus a cable traction and release device is obtained which permits easy and progressive pivoting of the lever without the friction spring being subjected to excessive constraints.

The embodiment shown in FIGS. 3 to 5 is an analogous arrangement to that previously described and illustrated in FIGS. 1 and 2. The same reference numerals will therefore be applied to identical elements present in the two designs. In the second embodiment the widened end of the lever 3 has a transverse cylindrical opening 3a of equal circular cross-section over its full length, and the coupling hole 3b' and guide type orifice 3c open over their full length into the transverse opening 3a. In other words, the orifice 3c in the present case, is in the form of an annular slit which extends over a large part of the periphery of the widened end of the lever 3 and, in the clockwise direction, from the coupling hole 3b' to adjacent the seating hole 3b. In the transverse opening 3a is located a supporting bush 10 of the same length as the opening 3a and free to pivot about the axis of the opening 3a. The cylindrical periphery of the bush 10 has throughout the same cross-section, which is slightly less in diameter than the opening 3a. The inner wall of the bush 10 has two parts of different diameters 10a and 10b, connected by an annular radial shoulder 10c. The part 10a next to the collar 7 rests without appreciable play on the cylindrical surface 2a of the supporting drum 2, whilst the other part 10b is radially spaced in relation to the surface 2a so that together with the latter an annular cylindrical space is defined within which the friction spring 1 is located. Just as in the previous example, the spring 1 normally presses onto the supporting drum 2 as though it were fixed to it, hence in this position of the spring 1 there is a certain radial play between the part 10b of the inner wall of the bush 10 and the imaginary envelope of the cylindrical part of the spring 1. The end of the annular cylindrical space between the bush 10 and the supporting drum 2 and the end of the shoulder 10c, is closed by the annular projection 9a of the disc 9 which, by means of the said projection 9a rests on the supporting drum 2 and serves to support the corresponding end of the bush 10. The outer face of the bush 10 fully covers the peripheral slit or orifice 3c of the lever 3 and constitutes in this way a rotational mobile base of the said orifice 3c. Opposite the lug recesses 3d and 3e the bush 10 has the passage-type slits 10d and 10e for the ends 1a and 1b of the spring 1, the slits being essentially the same axial length as recesses 3d and 3e. The peripheral width of the slit 10d, associated with the recess 3d and intended to receive the end, in the form of an eyelet 1a of the spring 1, is barely greater than the thickness of the steel wire constituting the spring 1 and it thus serves as a support for the right-hand bent part of the end 1a of the spring. However the peripheral width of the slit 10a associated with the recess 3e for receiving the other end 1b of the spring 1 is at least equal, if not greater, than that of the recess 3e. The relative positions of the slits 10d and 10e is such that when the eyelet-shaped end 1a bears against one or the other of the faces of the slit 10d, the other folded end 1b of the spring 1 is deflected from the lateral faces of the corresponding slit 10e. In relation to the lug recesses 3d and 3e, the arrangement of the passage-type slits 10d and 10e is such that when the slit 10d through which the eyelet-shaped end 1a passes, is opposite the median zone of the lug recess 1d, and the lateral faces of the other passage-type slit 10e are withdrawn in relation to the lateral faces of the corresponding lug recess 3e.

The operating principle of this second embodiment is practically identical to that of the first embodiment, except that the cable 4 no longer rests on the widened part of the lever 3, but on the bush 10 which is pivoting is primarily fixed to the spring 1 and it cannot perform any pivotal motion other than via the spring 1. Thus all unintentional actuation of lever 3 by the cable is prevented, and hence the same applies to the spring and the lever 3. This lever is free to move on a circular arc of slight length, as determined by the deflection between the eyelet end 1a of the spring 1 and the face of the lug 3f of the corresponding lug recess 3d.

The embodiments as described and illustrated can be modified in a number of ways without departing from scope of the invention as defined by the claims annexed. Thus the ends of the friction spring 1 could be folded in different positions, for instance, so as to be tangential to the periphery of the supporting drum, or parallel to its axis, and to co-operate with the integral lugs of the lever arranged in a corresponding manner. In addition to this, the two lug recesses could be aligned in the axial direction of the drum 2 to form only a single recess, the one face of which co-operates with one end of the friction spring, and the other face co-operates with the other end.

What we claim as our invention and desire to secure by Letters Patent of the United States is:

1. In a cable traction and release device, particularly for a bicycle change speed device, comprising,
    a control lever having a transverse opening,
    a cable with which the control level co-operates,
    a fixed supporting axle in the form of a drum about which the lever pivots and which is located in said transverse opening,
    the drum being arranged to be fixed to a part of a bicycle such as a bicycle frame,
    an immobilization system intended to hold an end of the cable in a selected position on application of a tractive force to the cable by an adjusting spring incorporated in the change speed device,
    a friction mechanism including a cylindrical helical spring which presses on the drum, incorporated in the immobilization system, one end of the spring co-operating with said lever;
    improvement wherein one of two ends of the friction spring is connected directly to one end of the cable in such a way that any traction applied to said one end of the spring in a direction towards another end of the cable tends to press the spring into the drum,
    and the control lever includes two lugs each of which is associated with an end of the said spring and is able to urge the corresponding end of the spring in one of two opposing directions of friction spring disengagement.

2. A device according to claim 1, wherein the one end of the cable operatively connected to the lever passes through an opening in the friction spring.

3. A device according to claim 1, wherein the end of the lever having the transverse opening has around the latter at least one lateral lug recess which opens into the said opening and serves to receive one of the ends of the friction spring.

4. A device according to claim 3, wherein one of the faces of the lug recess serves as a lug for co-operation with one of the ends of the spring in one of the two directions of disengagement of the latter.

5. A device according to claim 3, wherein the lug recess accommodating the spring end which is connected to the cable, communicates with the exterior through a coupling hole which opens into a peripheral guide-type orifice which is provided concentrically to the axle on the periphery of the widened end of the lever and is intended for reception of the front end of the cable.

6. A device according to claim 1 wherein the friction spring is located in an annular cylindrical space between the drum and the transverse opening of the lever and in position on the drum it has a certain radial play in relation to the said opening.

7. A device according to claim 1 wherein at least one of the ends of the friction spring is bent outwardly.

8. A device according to claim 1 wherein at least one of the ends of the friction spring is bent radially outwards.

9. A device according to claim 1 wherein the end of the friction spring connected to the cable is formed in the shape of an eyelet, and the end of the cable passes through this eyelet to present an enlargement which bears against one of the faces of the said eyelet.

10. A device according to claim 1, wherein the drum and a cylindrical part of the friction spring are capped by a support bush which has two passage type slits for the ends of the friction spring and which serves as a support for the end of the cable connected to the friction spring.

11. A device according to claim 10, wherein the support bush is located in the transverse opening of the lever and is formed with a peripheral slit which opens into the said opening and into at least one lateral lug recess made in the said lever and in communication with the said opening, and the said slit serves to receive the end of the cable connected to the friction spring and is closed off by part of the surface of the said bush.

* * * * *